(12) United States Patent
DeFrang et al.

(10) Patent No.: US 7,516,178 B1
(45) Date of Patent: Apr. 7, 2009

(54) COMMUNICATING MESSAGES BETWEEN COMPONENTS IN A CLIENT/SERVER ENVIRONMENT USING A OBJECT BROKER

(75) Inventors: Bruce A. DeFrang, Batavia, IL (US); Patrick R. Lee, Bolingbrook, IL (US)

(73) Assignee: Computer Associates Think, Inc., Islandia, NY (US)

( * ) Notice: Subject to any disclaimer, the term of this patent is extended or adjusted under 35 U.S.C. 154(b) by 773 days.

(21) Appl. No.: 11/032,768

(22) Filed: Jan. 10, 2005

Related U.S. Application Data

(60) Provisional application No. 60/538,384, filed on Jan. 21, 2004.

(51) Int. Cl.
*G06F 15/16* (2006.01)

(52) U.S. Cl. .................... 709/203; 709/201; 709/202; 709/217; 709/223; 709/225; 709/227; 709/228; 709/229

(58) Field of Classification Search .............. 709/227, 709/228, 201, 202, 203, 217, 223, 225, 229
See application file for complete search history.

(56) References Cited

U.S. PATENT DOCUMENTS

| | | | |
|---|---|---|---|
| 5,694,598 A | | 12/1997 | Durand et al. |
| 5,710,889 A * | | 1/1998 | Clark et al. ............ 235/379 |
| 5,890,140 A * | | 3/1999 | Clark et al. ............ 705/35 |
| 6,009,428 A | | 12/1999 | Kleewein et al. |
| 6,058,378 A * | | 5/2000 | Clark et al. ............ 705/37 |
| 6,202,099 B1 | | 3/2001 | Gillies et al. |
| 6,477,580 B1 | | 11/2002 | Bowman-Amuah |
| 6,606,660 B1 | | 8/2003 | Bowman-Amuah |
| 6,615,253 B1 | | 9/2003 | Bowman-Amuah |
| 7,003,587 B1 * | | 2/2006 | Battat et al. ............ 709/227 |
| 7,007,142 B2 * | | 2/2006 | Smith ............ 711/162 |
| 2004/0139153 A1 | | 7/2004 | Heidenreich |
| 2004/0143660 A1 | | 7/2004 | Dimitroff et al. |
| 2004/0167862 A1 | | 8/2004 | Yabloko |
| 2004/0198329 A1 * | | 10/2004 | Vasa ............ 455/414.1 |

* cited by examiner

*Primary Examiner*—Liangche A Wang
(74) *Attorney, Agent, or Firm*—Pillsbury Winthrop Shaw Pittman LLP

(57) ABSTRACT

In one embodiment, a method for communicating messages between components in a client/server environment comprises initiating, in response to a request from an application on a server system, a process for receiving messages from one or more first components associated with a client system, the process initiated using a generalized architecture for communicating messages between components in a client/server application. The method includes registering with the process one or more second components associated with the application, receiving at the process associated with the application a message intended for a second component on the server system, the message initiated by a first component on a client system. The method includes unpacking at least a portion of the received message, determining the second component associated with the server system for which the message is intended, and initiating the second component for which the message is intended in response to the message.

24 Claims, 2 Drawing Sheets

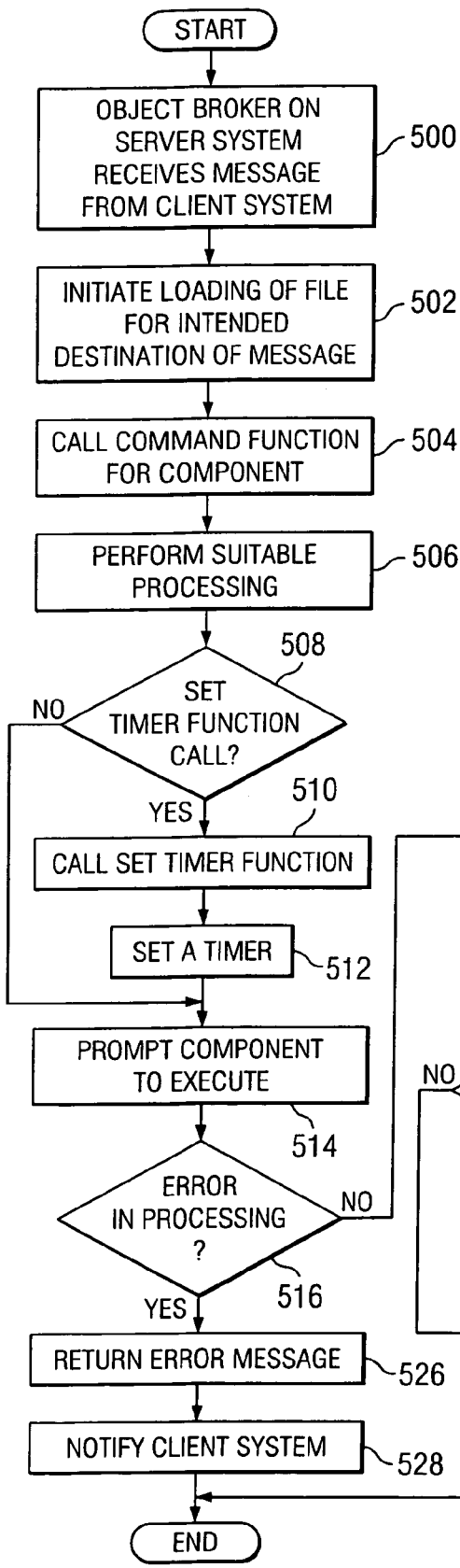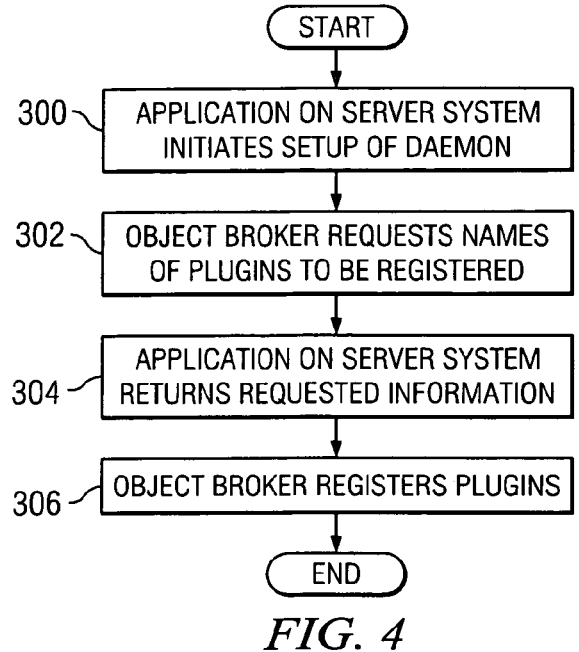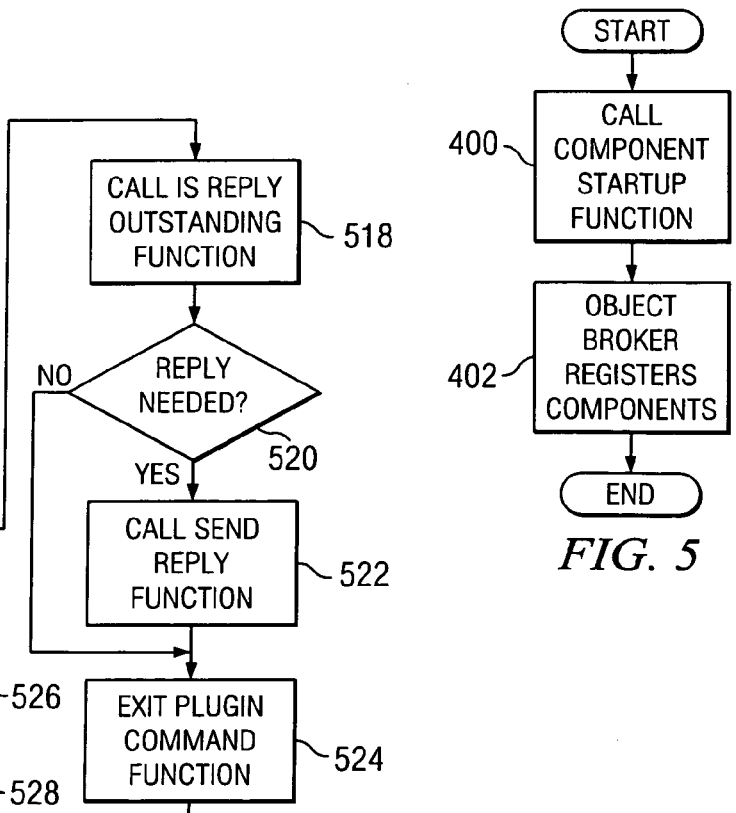
FIG. 4
FIG. 5
FIG. 6

COMMUNICATING MESSAGES BETWEEN COMPONENTS IN A CLIENT/SERVER ENVIRONMENT USING A OBJECT BROKER

RELATED APPLICATION

This application claims the benefit of U.S. Provisional Application No. 60/538,384 filed Jan. 21, 2004.

TECHNICAL FIELD

This disclosure relates generally to the field of client/server applications and more specifically to communicating between components in a client/server environment using an object broker.

BACKGROUND

In a distributed computing environment such as a client/server environment, software may be distributed between one or more server computers and one or more client computers to provide certain functionality. For example, a client/server environment may include software associated with a manager, an agent, and a client, such as application program interfaces (APIs). Current techniques for writing software for a client/server environment include stand-alone lightweight directory access protocol daemon (SLAPD), which is part of the open lightweight directory access protocol (LDAP). SLAPD is specific to writing a directory server and generally allows components to be plugged into it dynamically. A simple object access protocol (SOAP), which is part of the World Wide Web Consortium, is a lightweight protocol for exchange of information in a decentralized, distributed environment. SOAP is for use with Java applications and requires messages to be encapsulated in eXtensible markup language (XML). SOAP has been implemented by APACHE and MICROSOFT.

SUMMARY

This disclosure provides an object broker for communicating between components in a client/server environment.

In one embodiment, a method for communicating messages between components in a client/server environment, comprises receiving from a first component associated with a client system a request to communicate with a second component associated with a server system, the request comprising one or more parameters. The method includes establishing a connection with the server system associated with the second component based on the request, packaging the one or more parameters for communication to a process on the second server, the second component on the server system having registered with the process, and communicating the one or more parameters to the process on the server system for initiating the second component.

In one embodiment, a method for communicating messages between components in a client/server environment comprises initiating, in response to a request from an application on a server system, a process for receiving messages from one or more first components associated with a client system, the process initiated using a generalized architecture for communicating messages between components in a client/server application. The method includes registering with the process one or more second components associated with the application, receiving at the process associated with the application a message intended for a second component on the server system, the message initiated by a first component on a client system. The method includes unpacking at least a portion of the received message, determining the second component associated with the server system for which the message is intended, and initiating the second component for which the message is intended in response to the message.

BRIEF DESCRIPTION OF THE DRAWINGS

For a more complete understanding of the present disclosure and its advantages, reference is now made to the following descriptions, taken in conjunction with the accompanying drawings, in which:

FIG. 4 illustrates an example method for registering one or more plug-ins of an application with the object broker associated with the server system;

FIG. 5 illustrates an example method for registering one or more new plug-ins of an application with the object broker associated with the server system; and FIG. 6 illustrates an example method for handling client/server communication using the object broker of the server system.

DESCRIPTION OF EXAMPLE EMBODIMENTS

Figure 1:
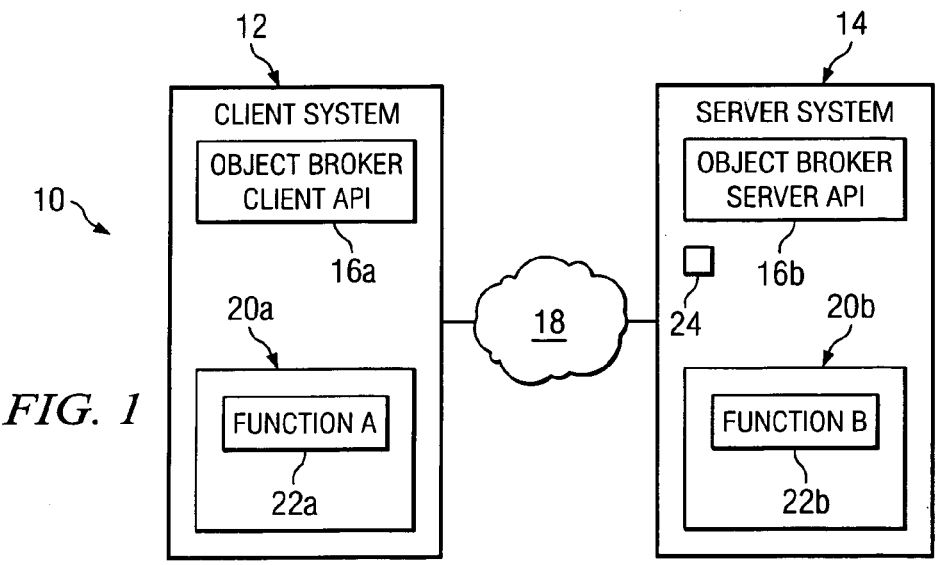
FIG. 1 illustrates an example system for communicating between components in a client/server environment using an object broker.

FIG. 1 illustrates an example system 10 for communicating between components in a client/server environment using an object broker. In one embodiment, system 10 includes one or more client systems 12 and a server system 14. Although system 10 is illustrated as a client/server environment including one or more client systems 12 and server system 14, this is merely for example purposes and system 10 may include any suitable computing environment. System 10 includes an object broker 16 for use in writing client/server applications. In general, object broker 16 provides a generalized client/server architecture for sending and receiving data between computers and applications such as may be associated with client system 12 and server system 14. In one embodiment, the client/server architecture provided by object broker 16 is "generalized" in that it can service multiple applications and/or multiple types of applications. Object broker 16 may be a subsystem that hides the complexities of packaging data, transporting data, guaranteed delivery of data, and targeting of applications between two or more computers or computer systems (e.g., client system 12 and server system 14). Object broker 16 may be implemented using any suitable combination of software, hardware, firmware, and any other suitable components according to particular needs. In one embodiment, object broker 16 supports application plug-ins, which may perform certain product functions, while seamlessly handling certain client/server operations. Object broker 16 may be implemented on WINDOWS, UNIX, or any other suitable operating system according to particular needs.

In one embodiment, object broker 16 simplifies the task of writing client/server applications such as may be used with system 10. Object broker 16 may handle certain tasks associated with client/server communications. For example, object broker 16 may handle interfacing with the communications application program interfaces (APIs), writing a service or daemon that listens for incoming communications, responding to service provider shutdowns, or other suitable tasks according to particular needs.

In one embodiment, object broker 16 supports store-and-forward (SAF) communication of messages for substantially guaranteed delivery of messages. SAF communication may include the ability to store messages locally when a manager component on a remote node is not available. For example, when a local manager component attempts to send a message to a manager component on a remote node and the message cannot be delivered to the remote node, the message may be added to a list or queue and forwarded to the remote node when the remote node is available again. SAF communication of messages is described in more detail in co-owned U.S. patent application Ser. No. 11/040,147, entitled "System and Method for Communicating Messages Among Components in a Computing Environment," filed Jan. 21, 2005. In addition to or as an alternative to SAF communication, the object broker may support the use of queues to communicate data in substantially real-time. In one embodiment, the queues are standard queues used for communication; however, the present disclosure contemplates using any suitable types of specialized queues or queue schemes, according to particular needs.

Each client system 12 may include input devices, output devices, mass storage media, processors, memory, interfaces, communication ports, or other appropriate components for communicating with server system 14. Additionally, each client system 12 may include a personal computer, workstation, network computer, kiosk, wireless data port, personal data assistant (PDA), one or more processors within these or other devices, or any other suitable processing device. Furthermore, although one client system 12 is illustrated, the present disclosure contemplates system 10 including any suitable number of client systems 12, according to particular needs.

Moreover, "client system 12" and "user of client system 12" may be used interchangeably without departing from the scope of this disclosure. As an example, client system 12 may comprise a computer that includes an input device, such as a keypad, touch screen, mouse, or other device that can accept information, and an output device that conveys information associated with the operation of server system 14 or client system 12, including digital data, visual information, or any other suitable information. Both the input device and output device may include fixed or removable storage media such as a magnetic computer disk, CD-ROM, or other suitable media to both receive input from and provide output to users of client systems 12. Server system 14 may accept data from client system 12 via a web browser (e.g., Microsoft Internet Explorer, Netscape Navigator, or any other suitable web browser) associated with client system 12 and return the appropriate HTML, eXtensible Markup Language (XML), or other suitable responses.

Server system 14 includes one or more electronic computing devices operable to receive, transmit, process and store data associated with system 10. For example, server system 14 may include one or more general-purpose personal computers (PCs), Macintoshes, workstations, Unix-based computers, server computers, or any other suitable devices. In one embodiment, server system 14 includes a web server. In short, server system 14 may include software and/or hardware in any suitable combination.

FIG. 1 merely provides one example of computers that may be used with the disclosure. For example, although FIG. 1 provides one example of server system 14 that may be used with the disclosure, system 10 may be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device.

Client system 12 and server system 14 may communicate via a network 18 in a client/server or other distributed environment. Network 18 facilitates wireless or wireline communication between server system 14 and other computers such as client system 12. Network 18 may communicate, for example, Internet Protocol (IP) packets, Frame Relay frames, Asynchronous Transfer Mode (ATM) cells, voice, video, data, and other suitable information between network addresses. Network 18 may include one or more local area networks (LANs), radio access networks (RANs), metropolitan area networks (MANs), wide area networks (WANs), all or a portion of the global computer network known as the Internet, and/or any other communication system or systems at one or more locations. In one embodiment, client system 12 and server system 14 are local to one another. In another embodiment, client system 12 and server system 14 are remote from one another.

System 10 may include one or more applications 20 that may be distributed to run in the client/server environment. For example, client system 12 may include one or more client applications 20*a* and server system 14 may include one or more server applications 20*b*. In one embodiment, client applications 20*a* and server applications 20*b* may be associated with a single application 20 (e.g., a part of the same software product). In another embodiment, client applications 20*a* and server applications 20*b* may be associated with different applications, but may interact with one another in any suitable manner. A single server application 20*b* may serve any suitable number of client applications 20*b*. A single client applications 20*a* may interact with any suitable number of server applications 20*b*.

The following example may provide an additional understanding of example functionality of object broker 16. Assume an application 20 is distributed to run in a client/server manner, a client application 20*a* being associated with client system 12 and a server application 20*b* being associated with server system 14. For example, assume client application 20*a* associated with client system 12 includes a function 22*a*, and client application 20*b* associated with server system 14 includes a function 22*b*. Assume that function 22*a* calls function 22*b*. As an example, the function call for function 22*b* may be:

int B(int iAction, char *pszInput, char **pszOutput)

In this example, function 22*b* accepts an integer (iAction) and a string (*pszInput) as input and returns a string (pszOutput) as output. Function 22***b* also returns a return code.

For function 22*b* on a server (e.g., server system 14), the input parameters for function 22*b* may be packaged at client system 12 where function 22*a* runs. In one embodiment, if function 22*b* runs on a different platform (e.g., a different operating system), the data as packaged by function 22*a* may be packaged in such a way that it can be understood on the platform associated with function 22*b*. As an example, the integer iAction may be rebuilt if the platform associated with client system 12 is little endian and the platform associated with server system 14 is big endian. Object broker 16 may handle this packaging of data. In one embodiment, data packaging is accomplished using self defined data (SDD), and in one embodiment, object broker 16 is configured to expect SDD.

The data packaged at client system 12 may be communicated to server system 14 where function 22b is stored. In one embodiment, if function 22b on server system 14 will return results based on the function call to function 22b, it may be desirable to identify a destination to which the results should be sent, so that server system 14 or a component associated with server system 14 knows where to send the results. In one embodiment, this destination should be a unique destination. For example, it may be undesirable for two instances of application 20 running function 22a to accidentally receive each other's results because each instance was using the same message queue for reply communications from server system 14. A reply identifier may be added to a package communicated by function 22a to function 22b, so that function 22b (or another suitable component of server system 14) can identify where to send the reply communication. Function 22a or another suitable component of client system 12 may send the package (including the reply identifier), handle communication errors, and wait for the reply from function 22b (or another suitable component of server system 14), if appropriate. In one embodiment, object broker 16 handles these functions.

In one embodiment, a process 24 in which to include function 22b is written on server system 14. In one embodiment, process 24 comprises a daemon or service (referred to collectively throughout the remainder of this disclosure as a daemon). In general, process 24 may include software, code, a program, an operation, an executable, or any other suitable type of process according to particular needs. Object broker 16 may provide a suitable framework with which to write process 24. This framework may be generalized such that multiple applications and/or multiple types of applications can write processes 24. In one embodiment, functionality is provided for shutting down process 24. For example, a program may be provided for prompting process 24 to shut down. Furthermore, process 24 may be able to "hear" the request to shut down. Process 24 may listen for incoming messages (e.g., from client system 12 or other suitable locations), unpack the incoming messages to some extent or another, and pass some or all of the unpack data on to the appropriate destination (e.g., function 22b). In one embodiment, the process 24 processes one message at time (i.e., it finishes a current message before processing a new message). In another embodiment, process 24 can process multiple requests substantially simultaneously. For example, process 24 may be operable to initiate function 22b as a thread. In this example, it may be desirable to monitor the threads, so that process 24 on server system 14 does not shut down while any threads are running.

Once initiated by process 24, function 22b may perform its processing on the parameters received from function 22a via process 24. In one embodiment, the processing time associated with function 22b performing its processing may affect the overall performance of system 10. Function 22b may communicate its results back to client system 12 (e.g., function 22a), if appropriate. While the destination for the results of function 22b is primarily described as being associated with client system 12, the present disclosure contemplates the results of the function 22b being communicated to any suitable destination, according to particular needs. Function 22b or another suitable component may determine where the results should be communicated, using the additional information (i.e., the reply identifier) placed in the input package at client system 12 for example. Function 22b or another suitable component may bundle the results as a package and send the results to client system 12 or another suitable destination.

Function 22b may encounter or generate an error when performing its processing on the input parameters received from function 22a via process 24 initiated using object broker 16. This error may cause function 22b to skip the logic to send a reply to client system 12, which may cause certain further problems. For example, client system 12 may hang up and wait infinitely for a reply. In one embodiment, a server portion of object broker 16 (e.g., object broker 16b) handles processing of these errors. Function 22b may prepare two return packages, using SDD for example, one for the results and one for messages. Object broker 16b may package these return packages together, possibly along with the return code from function 22b, and return them to function 22a or another suitable component on client system 12. In one embodiment, if function 22b encounters an error and terminates without informing object broker 16b to return results to function 22a on client system 12, then object broker 16b may automatically return a package to function 22a on client system 12 that includes a return code indicating that function 22b encountered an error. For example, this may be based on object broker 16b not receiving a message from function 22b within a predetermined time.

In one embodiment, additional daemons may be written on server system 14 and applications 20b (e.g., other products) may be associated with other daemons. Object broker 16b may be able to combine these daemons into a single process 24. In one embodiment, object broker 16b may bundle any suitable number of separate plug-ins on server system 14 into a single process 24. A plug-in may include a function, object, procedure, application, sub-application, daemon, service, or any other suitable process or component. For example, function 22b may be a plug-in associated with application 20b on server system 14.

In one embodiment, object broker 16 uses transmission control protocol (TCP) for communications via queues; however, the present disclosure contemplates object broker 16 using any suitable communications protocol, according to particular needs. In certain embodiments, object broker 16 simplifies the task of changing communication protocols. For example, using object broker 16, it may be possible to change or add a communication protocol (e.g., from TCP to HTTP) to object broker 16 such that some or all applications using object broker 16 may use the new communication protocol without requiring rewrites of the applications.

In one embodiment, object broker 16 supports SAF communication. Different communication APIs may be used for SAF than are used for communication using standard queues. In certain embodiments, object broker 16 supports both SAF communication and standard queues communication such that applications 20 operate substantially the same regardless of how messages are communicated.

In one embodiment, object broker 16 may be divided into object broker 16a, which may provide a client API, and object broker 16b, which may provide a server API. Each of client API (e.g., object broker 16a on client system 12) and server API (e.g., object broker 16b on server system 14) may be stored as a dynamic link library (DLL) file or in any other suitable manner, according to particular needs. Each of the client API and the server API may include one or more functions.

The following description provides an example client API for the client object broker 16a. The content and arrangement of the example client API described merely provide a non-limiting example. Portions of the client API described may not be required and others not described may be included and still fall within the spirit and scope of the present disclosure. Furthermore, the functions, function names, and parameters described below are provided merely as examples. The type definitions (typedefs) and functions for the client API may be defined in a header, which may be referred to as "ClientAPI.h" for example. In one embodiment, the client API may include one or more of the following functions: an Initialize function, a QuesConnect function, an SafConnect function, a Disconnect function, a Terminate function, a Converse function, a Send function, and any other suitable function, according to particular needs.

In one embodiment, the client API may be used by performing the following steps. A "handle" for communications may be declared and initialized, using a HANDLE typedef and the Initialize( ) function for example. The handle may be connected to a server such as server system 14. In one embodiment, this connection is performed using one of the following functions: QuesConnect( ), SafRemoteConnect( ), and SafLocalConnect( ). For example, the QuesConnect( ) function may be used for standard queues communication and the SafRemoteConnect( ) and SafLocalConnect( ) functions may be used for SAF communications. In one embodiment, using an SAF daemon may allow a single function to be used for SAF without regard to whether the destination is local or remote.

Communication with the server (e.g., server system 14) may be initiated using either a Converse( ) or Send( ) function. In one embodiment, this communication can be repeatedly performed. In one embodiment, it is possible to switch back and forth between the Converse function and the Send function. Object broker 16a may disconnect from the server (e.g., server system 14) using a Disconnect( ) function. This step may be optional and may only be performed if it is desirable or necessary to connect to another server using the same handle. The handle used for communications may be destroyed and any resources may be released, using a Terminate( ) function for example.

Examples of the functions mentioned above are described in more detail below. The function names and the details of the functions, as well as the example parameters, are provided merely as non-limiting examples and the present disclosure is not intended to be so limited.

Initialize

The Initialize function may initialize a handle for communications with a daemon or service. For example, client system 12 may call the Initialize function to initialize a handle for communication with process 24 associated with server system 14.

Function call:
HANDLE Initialize(void);.
Return Value:
A handle for communications, or NULL if there is insufficient memory.
Parameters:
None.

QuesConnect

The QuesConnect function may connect to a daemon or service plug-in (e.g., process 24) using queues. For example, client system 12 may call the QuesConnect function to connect to a daemon or service plug-in (e.g., process 24) associated with server system 14 using queues. In one embodiment, the queues are standard queues used for communication; however, the present disclosure contemplates using any suitable types of specialized queues or queue schemes, according to particular needs.

Function call:
unsigned long QuesConnect(HANDLE h, UTF8*pszMachineName, UTF8 *pszQueName, SDD_HANDLE *psddMessage);.
Return Value:
A return code.
Parameters:
h: A connection handle, which may be initialized by Initialize( ).
pszMachineName: The name of the machine on which the daemon or service (e.g., process 24) is running (e.g., the name of server system 14). If the daemon or service (e.g., process 24) is running locally, it may be possible to either provide the name of the local machine or to pass NULL.
pszQueName: The name of the queue used to communicate to the daemon or service plug-in (e.g., process 24). In one embodiment, each plug-in has a unique queue name, which may be thought of as the phone number of the plug-in. Queue names are described in more detail below.
psddMessage: In one embodiment, this is an optional parameter. This parameter may specify an SDD handle to receive error messages returned if the function (e.g., the function being called such as function 22b) fails. If it is not desirable to specify an SDD handle to receive error messages, NULL may be passed as the value. Otherwise, a pointer to a NULL SDD_HANDLE may be passed. If messages are returned, the SDD_HANDLE will no longer be NULL. After processing the messages, it may be desirable to destroy the handle, using an SddDestroy( ) function for example.

SafConnect

The SafConnect function may connect to a daemon or service plug-in (e.g., process 24) using SAF. In one embodiment, communicating using SAF differs from communicating using queues at least in that the destination daemon or service (e.g., process 24) does not have to be running when the message is sent. Using SAF, if the daemon or service (e.g., process 24) is not running, it may receive the message later when the daemon or service is running, even if the sending client program (e.g., function 22a) is not running at that time. In one embodiment, due to the possibility of delay, it may only be possible to send messages with an SAF connection. In other words, it may not be possible to converse.

Function call:
unsigned long SafConnect(HANDLE h, UTF8 *pszMachineName, UTF8 *pszSafQueName, SDD_HANDLE *psddMessage);.
Return Value:
A return code.
Parameters:
h: A connection handle, which may be initialized by Initialize( ).
pszMachineName: The name of the machine on which the daemon or service (e.g., process 24) is running (e.g., the name of server system 14). If the daemon or service (e.g., process 24) is running locally, it may be possible to either provide the name of the local machine or to pass NULL.
pszSafQueName: The name of the SAF queue used to communicate to the daemon or service plug-in (e.g., process 24). In one embodiment, each plug-in has a unique SAF queue name, which may be thought of as the phone number of the plug-in. Queue names are described in more detail below with reference to the section entitled Plug-in Queue Names.

psddMessage: In one embodiment, this is an optional parameter. This parameter may specify an SDD handle to receive error messages returned if the function (e.g., the function being called such as function 22b) fails. If it is not desirable to specify an SDD handle to receive error messages, NULL may be passed as the value. Otherwise, a pointer to a NULL SDD_HANDLE may be passed. If messages are returned, the SDD_HANDLE will no longer be NULL. After processing the messages, it may be desirable to destroy the handle, using an SddDestroy( ) function for example.

Disconnect

The Disconnect function may disconnect from a daemon or service plug-in (e.g., process 24). The Disconnect function may leave the handle intact. In one embodiment, subsequent connections may be made using the handle. The disconnect function may be optional. When a handle is destroyed, using a Terminate function described below for example, any connection may be automatically disconnected.

Function call:
unsigned long Disconnect (HANDLE h);.
Return Value:
A return code.
Parameters:
h: A connection handle.

Terminate

The Terminate function may destroy a connection handle, breaking any connection that may be in effect using the connection handle. The connection handle may be set to NULL upon return from the Terminate function. In one embodiment, if the connection handle is already set to NULL, then no action is taken. Thus, it may be valid to call the Terminate( ) function without first testing whether the handle has been initialized.

Function call:
unsigned long Terminate (HANDLE *ph);.
Return Value:
A return code.
Parameters:
ph: A pointer to a connection handle.

Converse

The Converse function may send a message to a daemon or service plug-in (e.g., process 24) and receive a reply from the daemon or service plug-in.

Function call:
unsigned long Converse (HANDLE h, UTF8 *pszCommand, SDD_HANDLE hsddData, SDD_HANDLE *phsddResults, SDD_HANDLE *psddMessage);.
Return Value:
A return code.
Parameters:
h: A connection handle, which may be connected using the QuesConnect( ) function. In one embodiment, SAF connections are not valid, in part because a reply may be returned and the calling function (e.g., function 22a) may not be running when the reply is sent.
pszCommand: A command to send to a daemon or service plug-in (e.g., process 24). If there is no command, NULL may be specified.
hsddData: An SDD list of values to be sent to the daemon or service plug-in (e.g., process 24). If no values are to be sent (e.g., because the command value is sufficient by itself), NULL may be specified.
phsddResults: In one embodiment, this is an optional parameter. This parameter may specify an SDD handle to receive the results. If it is not desirable to specify an SDD handle to receive the results, NULL may be passed as the value. Otherwise, a pointer to a NULL SDD_HANDLE may be passed. If results are returned, the SDD_HANDLE will no longer be NULL. After processing the results, it may be desirable to destroy the handle, using an SddDestroy( ) function for example.
phsddMessage: In one embodiment, this is an optional parameter. This parameter may specify an SDD handle to receive error messages returned if the function (e.g., the function being called such as function 22b) fails. If it is not desirable to specify an SDD handle to receive error messages, NULL may be passed as the value. Otherwise, a pointer to a NULL SDD_HANDLE may be passed. If messages are returned, the SDD_HANDLE will no longer be NULL. After processing the messages, it may be desirable to destroy the handle, using an SddDestroy( ) function for example.

Send

The Send function may send a message to a daemon or service plug-in (e.g., process 24) and not wait for a reply.

Function call:
unsigned long Send (HANDLE h, UTF8 * pszCommand, SDD_HANDLE hsddData);.
Return Value:
A return code.
Parameters:
h: A connection handle. In one embodiment, the connection may be established using either queue communication or SAF communication.
pszCommand: A command to send to a daemon or service plug-in (e.g., process 24). If there is no command, NULL may be specified.
hsddData: An SDD list of values to be sent to the daemon or service plug-in (e.g., process 24). If no values are to be sent (e.g., because the command value is sufficient by itself), NULL may be specified.

The following description provides an example server API for server object broker 16b. In one embodiment, one or more server APIs may be provided by the object broker 16b and one or more server APIs may be provided by an application (e.g., application 20). A daemon or service implemented using object broker 16 (e.g., process 24) may have any suitable number of plug-ins provided by an application, each communicating with one or more client systems 12 using queues and/or SAF. The plug-ins may be single-thread plug-ins or multi-thread plug-ins, according to particular needs.

The plug-ins may be identified, started, invoked, and operable to reply to a client system 12. For initialization, a process 24 (e.g., a daemon or service) associated with an application (e.g., application 20) may be associated with its own main( ) function. Process 24 may also be associated with a callback function for providing configuration information to object broker 16. In one embodiment, it may be desirable to name the callback function in a manner that will match the name in the function prototype provided (e.g., a daemonInformation( ) function). The main( ) function and the callback function may be linked into the executable of process 24. In one embodiment, the core code of object broker 16b is included in one or more separate DLLs.

The main( ) function may, upon entry, call an object broker function such as an ServerMain( ) function, passing one or more suitable command line parameters (e.g., an argc parameter and an argv parameter) and a pointer to the callback function (e.g., daemonInformation( )). In one embodiment, if there are any command line parameters, then the executable may be performing a control type function, such as starting up or shutting down process 24. The object broker DLL may perform the function and return to the main( ) function, which may simply exit. If there are no command line parameters, then the executable may be in the process of being brought up as a process 24. The object broker DLL may perform some initialization, possibly calling the callback function (e.g., daemonInformation( )) one or more times in the process.

The callback function (e.g., daemonInformation( )) may be called multiple times by object broker 16b during startup of process 24. When the callback function (e.g., daemonInformation( )) is called, a request parameter may indicate the type of information requested by object broker 16b. In one embodiment, a reply is returned from the callback function in an SDD list, the details of which are described in more detail below. In one embodiment, at a minimum, the callback function (e.g., daemonInformation( )) provides the name of its associated application and at least one associated plug-in. If there is more than one associated plug-in, the callback function (e.g., daemonInformation( )) may provide the names of all of the plug-ins, but this may not be required. A plug-in may also register additional plug-ins. For example, it may be desirable to have a single plug-in that performs management functions and to have this plug-in register all of the other plug-ins. The requests provided to the callback function (e.g., daemonInformation( )) and the content expected in the reply SDD may be defined in a header, which may be referred to as "ServerAPI.h". At this point, process 24 may be running and may continue to run until it is told to shut down or all of the plug-ins terminate themselves.

For communications with the client API, when a message is sent to a plug-in initiated by object broker 16b using the object broker client API (e.g., object broker 16a), object broker 16b may receive the message. In one embodiment, this occurs in a separate thread dedicated to the message queue for the plug-in. Depending on whether the plug-in is multi-thread or single-thread (which may be specified when the plug-in was registered), a plug-in command function for the plug-in (e.g., a PluginCommand( ) function) may be called either from the thread that received the message, or from a new thread that lives only for the duration of the plug-in command function. A copy of the command string and SDD list that were specified in the client API may be passed to the plug-in command function.

If client system 12 is expecting a reply (e.g., because the Converse( ) function was used), the plug-in may send a reply using a reply function of object broker 16b, such as a SendReply( ) function for example. The plug-in may determine whether a reply is needed or desired by calling a reply outstanding function of object broker 16b, such as an IsReplyOutstanding( ) function for example.

One or more of the following data items may be included in the reply communicated from server system 14 to client system 12: a return code, an optional SDD list containing the results, an optional SDD list containing messages, and any other suitable data according to particular needs. In one embodiment, predefined return codes may be defined in a header file such as "Common.h," for example. User-defined return codes may begin at a value RC_USER and go up from that point. In one embodiment, if a plug-in fails to send a reply when a reply is expected, then object broker 16b may send a reply so that the client system 12 does not hang. This reply may include a failure return code and/or message.

When a plug-in completes processing a command, the plug-in may return to object broker 16b, possibly returning a Boolean value. In one embodiment, a return value of TRUE indicates that the daemon or service should continue processing the queue, and a return value of FALSE indicates that the plug-in should be shut down and that no more messages should be processed for the plug-in.

One or more server APIs are provided by object broker 16b. The following description provides an example API for the server object broker provided by the object broker 16b. The content and arrangement of the example server API described merely provide a non-limiting example. Portions of the server API described may not be required and others not described may be included and still fall within the spirit and scope of the present disclosure. Furthermore, the functions, function names, and parameters described below are provided merely as examples. In one embodiment, the server API may include one or more of the following functions provided by the object broker: a ServerMain function, a SetProductInformation function, a StartupComponent function, a TerminateComponent function, an IsReplyOutstanding function, a SendReply function, a SetTimer function, and any other suitable function, according to particular needs.

ServerMain

The ServerMain function may be an entry point to object broker 16b. The ServerMain function may be called from the main( ) function of an application such as application 20.

Function call:

int ServerMain (P_DAEMON_INFORMATION pf_daemonInformation, int argc, char **argv);.

Return Value:

A return code.

Parameters:

pf_daemonInformation: A function pointer to a corresponding daemonInformation( ) function in an application's executable (e.g., application 20).

argc: An argc value passed to the application's main( ) function. This variable may be passed unchanged.

argv: The argv value passed to the application's main( ) function. This variable may be passed unchanged.

SetProductInformation

The SetProductInformation function may be called by the startup function (e.g., a Startup( ) function) associated with an application (e.g., application 20b—the "product") to register information about the application.

Function Call:

unsigned long SetProductInformation(SDD_HANDLE hsdd);.

Return Value:

A return code.

Parameters:

hsdd: An SDD list of application information. In one embodiment, the following SDD IDs may be included in the SDD list:

Id: SDDID_PRODUCT

Type: SDD_TYPE_TEXT

Required: In one embodiment, this SDD ID is required.

Contents: Provides the name of the application in which the server (e.g., server system 14) is being used.

Id: SDDID_SHUTDOWN_TIME_ALLOWED

Type: SDD_TYPE_LONG

Required: In one embodiment, this SDD ID is not required.

Contents: The elapsed time after shutdown has begun that plug-ins may have to terminate. Plug-ins still active after this time period may be considered hung and may be terminated so that the server (e.g., server system 14) can shut down. If this time period is not specified, then a default value may be used.

StartupComponent

The StartupComponent function may be called to register and launch a new component plug-in. In one embodiment, more than one component may be started at the same time, by specifying SDD entries for each component for example. In one embodiment, if more than one component is started, the StartupComponent function may take an all-or-nothing approach if there is a failure. For example, if one of the plug-ins fails to load, then none of the plug-ins will be loaded. If some of the plug-ins were loaded when the error occurs, then those plug-ins will be unloaded.

Function call:
unsigned long StartupComponent(SDD_HANDLE hsdd);.
Return Value:
A return code.
Parameters:
hsdd: An SDD list of plug-in information. In one embodiment, the following SDD IDs may be included in the SDD list:
Id: SDDID_COMPONENT
Type: SDD_TYPE_TEXT
Required: In one embodiment, this SDD ID is required.
Contents: Provides the name of the component being started.
This SDD entry may be repeated for each component to be started.
Child SDD:
Id: SDDID_DLLNAME
Type: SDD_TYPE_TEXT
Required: In one embodiment, this SDD ID is required.
Contents: The name of the DLL to load for the component. In one embodiment, multiple components may share the same DLL.
Id: SDDID_QUEUENAME
Type: SDD_TYPE_TEXT
Required: In one embodiment, this SDD ID is not required.
Contents: The queue name for communicating with this component.
Id: SDDID_SAF_QUEUENAME
Type: SDD_TYPE_TEXT
Required: In one embodiment, this SDD ID is not required.
Contents: The SAF queue name for communicating with this component via SAF.
Id: SDDID_MULTI_THREAD
Type: SDD_TYPE_BOOL
Required: In one embodiment, this SDD ID is not required. In one embodiment, the default value is TRUE.
Contents: Indicates whether the component can process multiple commands concurrently. If so, each new message received via queues may be processed in its own separate thread. A single thread may be used to process messages received via SAF. If the component cannot process multiple commands concurrently (i.e., it is not multi-thread), then a single thread may handle all messages, regardless whether they were received from queues or SAF.

TerminateComponent

The TerminateComponent function may be called by a plug-in to terminate another component. In one embodiment, the components are completely terminated upon return from this function except when a component attempts to terminate itself (i.e., the component for which a thread was created by object broker 16b). In that case, the component may begin termination, but the TerminateComponent function may not wait for the termination to complete.

Function call:
unsigned long TerminateComponent(SDD_HANDLE hsdd);.
Return Value:
In one embodiment, a return code of RC_SUCCESS (0) may indicate success and any other return code indicates an error.
Parameters:
hsdd: An SDD list of components to shut down. In one embodiment, each component may be represented by a single SDD entry as follows:
Id: SDDID_COMPONENT
Type: SDD_TYPE_TEXT
Required: In one embodiment, this SDD ID is required.
Contents: Provides the name of the component being terminated. This SDD entry may be repeated for multiple components.

IsReplyOutstanding

The IsReplyOutstanding function may be called by a component plug-in's plug-in command function (e.g., the PluginCommand( ) function) to determine whether client system 12 is waiting for a reply.

Function call:
BOOL_T IsReplyOutstanding(INSTANCE_HANDLE hInst);.
Return Value:
In one embodiment, a Boolean is returned. If a reply is outstanding, the value may be TRUE; otherwise, the value may be FALSE. In one embodiment, a reply is considered outstanding if client system 12 called process 24 using the Converse( ) function and a reply has not yet been sent. If a reply has been sent or if client system 12 called the daemon using the Send( ) function, for example, then there may be no reply outstanding and the Boolean value may be set to FALSE.
Parameters:
hInst: The hInst parameter passed to the plug-in command function (e.g., the PluginCommand( ) function).

SendReply

The SendReply function may be called by a component plug-in's plug-in command function (e.g., the PluginCommand( ) function) to send a reply to client system 12. In one embodiment, it may be desirable to only call this function once per plug-in command, and then only if a reply is expected (e.g., client system 12 called process 24 using Converse( )).

Function call:
unsigned long SendReply(INSTANCE_HANDLE hInst, long lReturnCode, SDD_HANDLE hSddResults, SDD_HANDLE hSddMessage);.
Return Value:
A return code.
Parameters:
hInst: The hInst parameter passed to the plug-in command function (e.g., the PluginCommand( ) function).

lReturnCode: The return code to be sent to client system 12 from the component plug-in. This return code may be the return code presented to client system 12 by the Converse( ) function.

hSddResults: An optional SDD list of results to be returned to client system 12. NULL may be specified if there is no list to return client system 12. A copy of this SDD list may be returned to client system 12 via the phsddResults parameter of the Converse( ) function.

hSddMessage: An optional SDD list of messages to be returned to client system 12. NULL may be specified if there is no list to return client system 12. A copy of this SDD list may be returned to client system 12 via the phsddMessage parameter of the Converse( ) function.

SetTimer

The SetTimer function may be called by the component plug-in's plug-in command function (e.g., the PluginCommand( ) function) to set a timer for itself. In one embodiment, when the time interval has elapsed, the plug-in is called with a command value of PLUGIN_SYSCMD_TIMER (#define symbol name). In one embodiment, the timer may be reset at any time, canceling a previously set timer. In one embodiment, a timer may also be explicitly cancelled by setting the time interval to zero.

If a component plug-in is not multi-thread (see, for example, StartupComponent( ) and SDD_ID_SDDID_MULTI_THREAD), the component plug-in may be notified sometime after the time interval elapses (e.g., if the plug-in is currently busy processing another command). If the component plug-in is multi-thread, then a new thread may be created for the timer notification.

Function call:
BOOL_T_cdecl SetTimer(INSTANCE_HANDLE hInst, long lMilliSeconds);.
Return Value:
In one embodiment, a Boolean value indicating success (TRUE) or failure (FALSE).
Parameters:
hInst: The hInst parameter passed to the plug-in command function (e.g., the PluginCommand( ) function).
lMilliSeconds: The elapsed time for the timer (e.g., in milliseconds).

One or more server APIs are provided by an application (e.g., application 20). The following description provides an example API for server object broker 16b provided by an application (e.g., application 20) that uses object broker 16b. The content and arrangement of the example server API described merely provide a non-limiting example. Portions of the server API described may not be required and others not described may be included and still fall within the spirit and scope of the present disclosure. Furthermore, the functions, function names, and parameters described below are provided merely as examples. In one embodiment, the server API may include one or more of the following functions provided by the application that uses object broker 16b: a daemonInformation function, a PluginStartup function, a PluginInitializeComponent function, a PluginCommand function, a PluginTerminateComponent function, a PluginShutdown function, and any other suitable function, according to particular needs.

daemonInformation

The daemonInformation function may be the callback function provided within an executable of an application. This function may have any suitable name; however, in certain embodiments, it may be desirable to name this function such that it substantially matches a prototype function provided in a header file (e.g., DaemonInfo.h). The daemonInformation function may be called several times during startup to provide information about the application to the object broker. The type of information requested may be indicated by a request parameter, and the reply may be returned via SDD in a phSdd parameter. In one embodiment, some of the requests may be assigned a default value if no SDD is returned. Although particular requests are described, the present disclosure contemplates any suitable requests according to particular needs. In certain embodiments, at a minimum, the name of the application corresponding to the callback function and information regarding at least one plug-in corresponding to the callback function should be returned when requested.

Function call:
unsigned long_cdecl daemonInformation(num DAEMON_INFO_REQUEST request, SDD_HANDLE *phSdd);.
Parameters:
request: This may be an enumeration indicating the type of information that is requested. In one embodiment, the values include one or more of the following:
daemonInfoRequestDaemonName=1
daemonInfoRequestNtCreateService=2
daemonInfoRequestWin9xCreateService=3
daemonInfoRequestObStartupOptions=4
daemonInfoRequestObPlugins=5
daemonInfoRequestCommandArgs=6 phSdd: This may be a pointer to an SDD handle in which to insert the reply. In one embodiment, the handle is already initialized, so it may be unnecessary to call the SddInit( ) function for the handle. If there is no reply to return for the information requested in the request parameter, the SDD list may be left unchanged. In one embodiment, for each request type, the following SDDs are returned:

Request: daemonInfoRequestDaemonName
SDD:
 Id: SDDID_PRODUCT
 Type: SDD_TYPE_TEXT
 Required: In one embodiment, this SDD ID is required.
 Contents: This may also be the service name, if process 24 daemon is a WINDOWS NT service or other suitable service for example.
 Id: SDDID_DISPLAY NAME
 Type: SDD_TYPE_TEXT
 Required: In one embodiment, this SDD ID is not required.
 Contents: Provides the display name of the application (e.g., application 20) for messages. This may also be the service display name, if process 24 is a WINDOWS NT service or other suitable service for example. If this parameter is not specified and the product is a service, then the SDDID_PRODUCT value may be used as the service display name by default.

Request: daemonInfoRequestNtCreateService. The present disclosure contemplates different daemonInfoRequestCreate-Service functions for different operating systems and different versions of operating systems, according to particular needs.
SDD:
 Id: SDDID_ACCESS
 Type: SDD_TYPE_LONG Required: In one embodiment, this SDD ID is not required. In one embodiment, the default is SERVICE_ALL_ACCESS.
Contents: The access desired by the service. This may correspond to a dwDesiredAccess parameter of a CreateService function.
Id: SDDID_INTERACTIVE
Type: SDD_TYPE_BOOL
Required: In one embodiment, this SDD ID is not required. In one embodiment, the default is FALSE.
Contents: Indicates whether the service may interact with the desktop. If set to TRUE, then the value SERVICE_INTERACTIVE_PROCESS may be specified in a dwServiceType parameter of a CreateService function.
Id: SDDID_START_TYPE
Type: SDD_TYPE_LONG
Required: In one embodiment, this SDD ID is not required. In one embodiment, the default is SERVICE_DEMAND_START.
Contents: Contains a dwStartType parameter for a CreateService function. This may include SERVICE_A UTO_START, SERVICE_DEMAND_START, or SERVICE_DISABLED.
Id: SDDID_INSTALL_PATH
Type: SDD_TYPE_TEXT
Required: In one embodiment, this SDD ID is not required. In one embodiment, the default is the path of the current executable module.
Contents: Indicates the path from which the service should be loaded. This value, combined with the file name of the current executable, may indicate the full executable file name of the service. It may be specified in a lpBinaryPathName parameter of a CreateService function.
Id: SDDID_DEPENDENCY_SERVICE
Type: SDD_TYPE_TEXT
Required: In one embodiment, this SDD ID is not required.
Contents: May specify the name of a service on which this service depends. In one embodiment, this SDD entry may be specified multiple times. The services listed in this SDD entry may be automatically started by the operating system (e.g., WINDOWS NT) when this service is started. In certain embodiments, if any of the services listed in this SDD entry shut down, the operating system (e.g., WIDOWS NT) may also shut down this service.
Id: SDDID_RUN AS_ACCOUNT
Type: SDD_TYPE_TEXT
Required: In one embodiment, this SDD ID is not required.
Contents: May specify the name of an account as which the service should log on. If this value is not specified, then the service may run under a LocalSystem account.
Id: SDDID_RUN_AS_PASSWORD
Type: SDD_TYPE_TEXT
Required: In one embodiment, this SDD entry is required if the SDDID_RUN_AS_ACCOUNT SDD was specified.
Contents: May specify the password of the SDDID_RUN_AS_ACCOUNT. In one embodiment, once the service has been created, this value may be cleared to binary zeros in the SDD list and then deleted. This function may be performed by the SDD API when the SDD list is destroyed.
Request: daemonInfoRequestObStartupOptions. In one embodiment, this request may only be used by an object broker process 24.
SDD:
　Id: SDDID_SHUTDOWN_TIME_ALLOWED
　Type: SDD_TYPE_LONG
　Required: In one embodiment, this SDD ID is not required.
　Contents: May specify the elapsed time after shutdown has begun that plug-ins have to terminate themselves. In one embodiment, plug-ins still active after this time period will be considered hung, and may be killed. This may allow the server to shut down. If this value is not specified, a default value may be used.
Request: daemonInfoRequestObPlugins. In one embodiment, this request may only be used by an object broker process 24.
SDD:
　Id: SDDID_COMPONENT
　Type: SDD_TYPE_TEXT
　Required: In one embodiment, this SDD ID is required.
　Contents: May specify the name of a component to start. In one embodiment, this value may be specified for each component plug-in to be started.
Child SDD:
　Id: SDDID_DLLNAME
　Type: SDD_TYPE_TEXT
　Required: In one embodiment, this SDD ID is required.
　Contents: May specify the name of the DLL to load for the component. In one embodiment, multiple components may share the same DLL.
　Id: SDDID_QUEUENAME
　Type: SDD_TYPE_TEXT
　Required: In one embodiment, this value is only required if using queues to communicate with the plug-in.
　Contents: The queue name for communicating with this component.
　Id: SDDID_SAF QUEUENAME
　Type: SDD_TYPE_TEXT
　Required: In one embodiment, this value is only required if using SAF to communicate with the plug-in.
　Contents: The SAF queue name for communicating with this component using SAF.
　Id: SDDID_MULTI_THREAD
　Type: SDD_TYPE_BOOL
　Required: In one embodiment, this SDD ID is not required. In one embodiment, the default value is TRUE.
　Contents: May indicate whether the component can concurrently process multiple commands. If so, each new message received via queues may be processed in its own separate thread. A single thread may be used to process messages received via SAF. If not the component cannot concurrently process multiple commands (i.e., it is not multi-thread), then a single thread may be used to handle all messages, regardless of whether they were received using queues or SAF.

Request: daemonInfoRequestCommandArgs
SDD:
  Id: SDDID_ALLOW INSTALL_COMMAND
  Type: SDD_TYPE_BOOL
  Required: In one embodiment, this SDD ID is not required. In one embodiment, the default value is TRUE.
  Contents: May specify whether process 24 may be installed as a service via the command.
  Id: SDDID_ALLOW REMOVE_COMMAND
  Type: SDD_TYPE_BOOL
  Required: In one embodiment, this SDD ID is not required. In one embodiment, the default value is TRUE.
  Contents: May specify whether process 24 may be uninstalled as a service via the command.

PluginStartup

In one embodiment, the PluginStartup function is an optional startup function for a component plug-in DLL. If this function exists, it may be called after the component plug-in DLL is loaded. In one embodiment, the PluginStartup function is only called once, regardless of the number of components that may share the same DLL. Initialization logic that would typically be placed in a DllMain( ) function during DLL_PROCESS_ATTACH processing may instead be placed in the PluginStartup function. Placing this initialization logic in the PluginStartup function may be advantageous because, in certain embodiments, the PluginStartup function is called regardless of the platform, whereas DllMain( ) is typically limited to the WINDOWS platform. Furthermore, DLL_PROCESS_ATTACH processing may not enable the creation of threads or the loading of other DLLs. In certain embodiments, the PluginStartup function eliminates these restrictions.

Function call:
  BOOL_T_cdecl PluginStartup( );.
  Return Value:
  In one embodiment, the return value is a Boolean value. If FALSE is returned, the DLL may be unloaded, after calling a PluginShutdown( ) function, if one exists for example.
  Parameters:
  None.

PluginInitializeComponent

In one embodiment, the PluginInitializeComponent function is an optional function. The PluginInitializeComponent function may be called after the PluginStartup( ) function or after the point where the PluginStartup( ) function would have been called if none exists. In one embodiment, the PluginInitializeComponent function is called once for each component using a particular plug-in. Each component may be given its own unique void pointer (e.g., ppvUser), which may be provided to the PluginCommand( ) and PluginTerminateComponent( ) functions. In one embodiment, the component is responsible for releasing any resources anchored by this function, possibly using an PluginTerminateComponent( ) function.

Function call:
  BOOL_T_cdecl PluginInitializeComponent(UTF8 *pszComponent, void **ppvUser);.
  Return value:
  In one embodiment, the return value is a Boolean value. If FALSE is returned, the component may be shut down and the PluginCommand( ) function of the component may never be called; however, the PluginTerminateComponent( ) function may be called to handle cleanup.
  Parameters:
  pszComponent: May specify the name of the component being initialized.
  ppvUser: A void pointer that may be used to anchor memory for the component. In one embodiment, it is not a requirement to anchor data at this location—in most cases static storage is acceptable. In one embodiment, this provides a location to anchor data that is not specific to just the DLL, but may also be specific to the component if more than one component uses the DLL. It may be the responsibility of the component to free resources anchored at this location, possibly using an PluginTerminateComponent( ) function.

PluzinCommand

The PluginCommand function may be called after the PluginStartup( ) function or after the point where the PluginStartup( ) function would have been called if none exists. In one embodiment, the PluginCommand function is only called once for each component using the plug-in. Each component may be given its own unique void pointer (e.g., ppvUser), which may be provided to the PluginCommand( ) and PluginTermianteComponent( ) functions. In one embodiment, the component is responsible for releasing any resources anchored by this function, possibly using an PluginTerminateComponent( ) function. This may be the most involved part of an object broker plug-in.

Function call:
  BOOL_T_cdecl PluginCommand(UTF8 *pszComponent, UTF8 *pszCommand, SDD_HANDLE hsddComponentData, INSTANCE_HANDLE hInst, void **ppvUser);.
  Return Value:
  In one embodiment, the return value is a Boolean value. If FALSE is returned, the component may be shut down and the PluginCommand( ) function of the component may not be called again; however, the PluginTerminateComponent( ) function may be called to handle cleanup.
  Parameters:
  pszComponent: The name of the component.
  pszCommand: A copy of the command given to the Converse( ) function or the Send( ) function on client system 12.
  hsddComponentData: A copy of the SDD list given to the Converse( ) function or the Send( ) function (e.g., as the hsddData parameter) on client system 12.
  hInst: May be an instance handle that represents the current instance of a component plug-in call. In one embodiment, the hInst parameter should not be used directly by the component plug-in, but should be passed on to other function calls (e.g., IsReplyOutstanding( ) and SendReply( )). The hInst parameter may contain information regarding the current message or transaction.
  ppvUser: This parameter is described with reference to the ppvUser parameter of the PluginInitializeComponent( ) function.

PluginTerminateComponent

The PluginTerminateComponent function may be an optional function. It may allow a plug-in to perform termination for a component. In one embodiment, the PluginTerminateComponent function is called once for each component using the plug-in. For example, the PluginTerminateComponent function may be called before the PluginShutdown( ) function is called. In one embodiment, if resources were anchored in the unique void pointer (ppvUser) for the component, the resources should be released during the termination processing.

Function call:

void_cdecl PluginTerminateComponent(UTF8 *pszComponent, void **ppv User);.

Return Value:

There is no return value.

Parameters:

pszComponent: The name of the component being terminated.

ppvUser: This parameter is described with reference to the ppvUser parameter of the PluginInitializeComponent( ) function.

PluginShutdown

The PluginShutdown function may be an optional function. It may allow a plug-in to perform termination for a component. In one embodiment, the PluginShutdown function is called just before the plug-in DLL is downloaded, which may occur when the service is being shut down. The PluginShutdown function may allow the plug-in to perform termination in manner similar to what would be performed in a DllMain( ) function during DLL_PROCESS_DETACH processing. In an embodiment in which a DllMain( ) function exists, the PluginShutdown function may be called just before the DllMain( ) function. In one embodiment, the PluginShutdown function may only be called once, regardless of the number of components that use this DLL.

Function call:

void_cdecl PluginShutdown( );.

Return Value:

There is no return value

Parameters:

None.

For plug-in queue names, in one embodiment, queue names are the means by which object broker clients direct messages to the correct object broker process 24 plug-ins. For example, the queue names may be thought of as the phone number for the plug-in, and the server name (e.g., the name of server system 14) that corresponds to the queue name may be thought of as the area code. In one embodiment, it is desirable to establish one or more naming conventions for the queue names to help reduce or eliminate conflicts in queue names. In one embodiment, the naming standard may use a three-part name. The following example naming convention is provided for example purposes only and the present disclosure is not intended to be so limited. Although this naming convention is described, the present disclosure contemplates using any suitable naming convention, according to particular needs or desires.

The first part of the name may include a unique identifier to distinguish the use of queues in the context of object broker 16 from the use of queues with other applications. A period may be used as a separator. The second part of the queue name may include an application code (i.e., an application ID) assigned to an application that is using the object broker. A period and a dollar sign (.$) may be used as a second separator. The last part of the queue name (i.e., the suffix) may be determined by the developers of a particular application and may include any suitable means for avoiding conflicts with other queue names.

In one embodiment, a header file defines the one or more application IDs. For example, the header file may be called "CSproductIds.h". A queue name header file may include a macro that can be used to define queue names when provided a product ID and the suffix. For example, the head file may be called "CSqueName.h" and the macro may be called "QUEUENAME".

In one embodiment, when creating a queue name for use with SAF communication, the queue name should be a valid file name, without drive letters or directory specifications. This may be because a SAF file will be created using your queue name as part of the file name. There may be no such restrictions when creating regular queue names.

Figure 2:
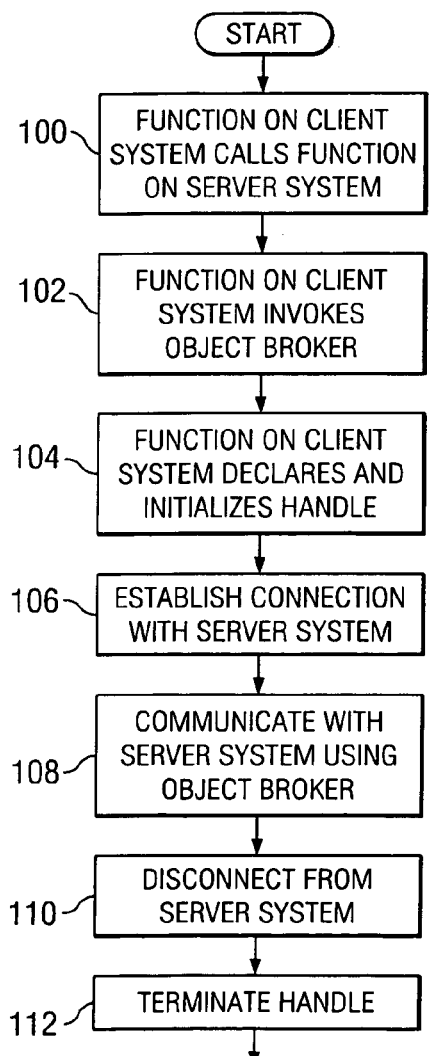
FIG. 2 illustrates an example method for handling client/server communication using a client application program interface (API) of the object broker associated with a client system.

FIG. 2 illustrates an example method for handling client/server communication using the client API of object broker 16a associated with client system 12. At step 100, a function 22a associated with an application 20a on client system 12 may make a function call to a function 22b associated with application 20 on server system 14. At step 102, object broker 16a may intercept the function call to function 22b. Although the present disclosure describes object broker 16a intercepting the function call to function 22b, the present disclosure contemplates function 22a invoking object broker 16a in any suitable manner such as including one or more calls to the client API in application 20. At step 104, object broker 16a may declare and initialize a handle for communication with the server associated with function 22b (i.e., server system 14). In one embodiment, application 20 that includes function 22a may call an Initialize function of object broker 16a to declare and initialize a handle for communications, using a HANDLE typedef for example. In one embodiment, this function call may serve as function 22b invoking object broker 16a. At step 106, object broker 16a may establish a connection with a server system 14. In one embodiment, application 20 that includes function 22a may call a QuesConnect( ) function, an SafConnect( ) function, or another suitable function to establish a connection with server system 14. For example, the QuesConnect( ) function may be used to communicate in real-time. As another example, the SafConnect( ) function may be used to provide substantially guaranteed delivery of messages, regardless of whether the destination functioning properly at the time the message is sent. As described above, the SafConnect( ) function may be divided into an SafLocalConnect( ) function and an SafRemoteConnect( ) function.

At step 108, object broker 16a may be used to communicate with server system 14. In one embodiment, application 20 that includes function 22a may call a Converse( ) function, a Send( ) function, or another suitable function to communicate with server system 14. In one embodiment, this communication can be repeatedly performed, and it may be possible to switch back and forth between the Converse function and the Send function. In one embodiment, the Converse function may not be used when communicating using SAF communication (e.g., the connection was established using the SafConnect function).

At step 110, object broker 16a may disconnect from the server associated with function 22b (e.g., server system 14). In one embodiment, application 20 that includes function 22a may call a Disconnect( ) function. This step may be optional and may only be performed if it is desirable or necessary to connect to another server using the same handle. Additionally, in one embodiment, if the Converse( ) function was used to communicate with server system 14, application 20 that includes function 22a may not call the Disconnect( ) function until it receives a reply from server system 14 (e.g., the reply initiated by function 22b on server system 14).

At step 112, object broker 16a may destroy the handle used for communication with server system 14. In one embodiment, application 20 that includes function 22a may call a Terminate( ) function to destroy the handle and to release any resources. Additionally, in one embodiment, if the Converse( ) function was used to communicate with server system 14, application 20 that includes function 22a may not call the Terminate( ) function until it receives a reply from server system 14 (e.g., the reply initiated by function 22b on server system 14).

Figure 3:
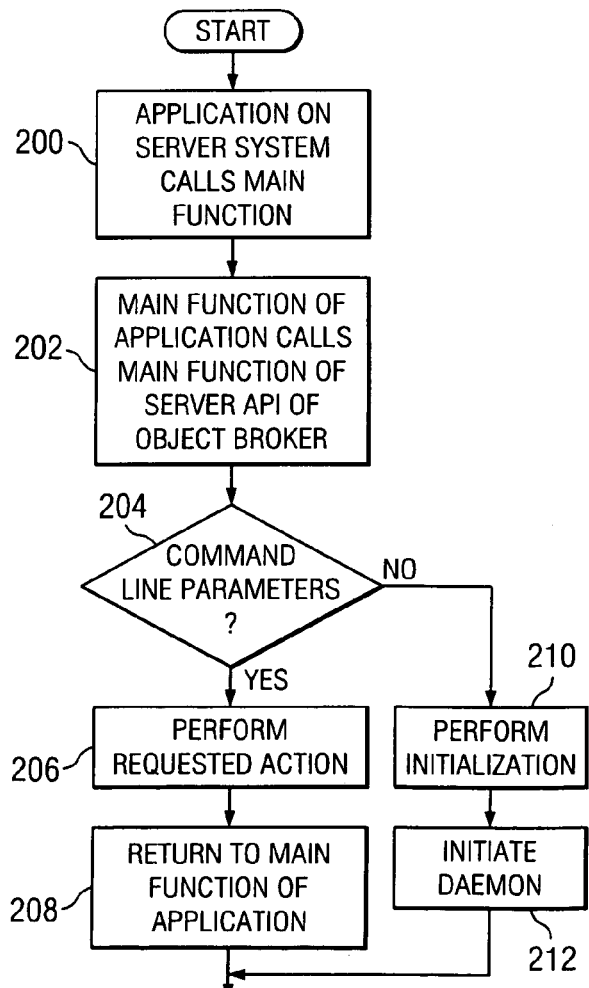
FIG. 3 illustrates an example method for an application to initiate a daemon on server system using a server API of the object broker associated with a server system.

FIG. 3 illustrates an example method for an application 20 to initiate a process 24 on server system 14 using the server API of object broker 16b associated with server system 14. As described above, in one embodiment, process 24 comprises a daemon or service (referred to collectively throughout the remainder of this disclosure as a daemon). In general, process 24 may include software, code, a program, an operation, an executable, or any other suitable type of process according to particular needs. Object broker 16 may provide a suitable framework with which to write process 24. This framework may be generalized such that multiple applications and/or multiple types of applications can write processes 24. Process 24 may be initiated for receiving messages from functions on client system 12 (e.g., function 22a) associated with application 20. Although a daemon is primarily described, the present disclosure contemplates the use any suitable process 24, such as a service for example. In one embodiment, process 24 created using the object broker 16b can have one or more plug-ins provided by an application such as application 20. These plug-ins may correspond to one or more functions or other components of application 20 running on server system 14 that expect to be called by functions or other components running on client system 12. Each plug-in or service may be communicating with client system 12 using queues, SAF, or in any other suitable manner. The plug-ins may be single-thread or multi-thread, according to particular needs. In one embodiment, the application 20 includes a main function and a callback function. In one embodiment, the callback function may be entitled daemonInformation( ). In one embodiment, prior to initiating a process 24 on server system 16 using the server API of object broker 16b associated with server system 14, application 20 may include a startup function (e.g., Startup( )), which may call a registration function associated with the server API of object broker 16b (e.g., a SetProductInformation function). This function may be used to register information about application 20 with object broker 16.

At step 200, application 20 may call its main function. At step 202, the main function of application 20 may call a main function of the server API of object broker 16b on server system 14. For example, the main function of process 24 may call a ServerMain function of the server API of object broker 16b. In one embodiment, application 20 may pass a pointer to its callback function (e.g., daemonInformation) and one or more command line parameters (e.g., argc and argv) as parameters in the call to the main function of the server API of object broker 16b. At step 204, the main function of the server API of object broker 16b may determine if any command line parameters in the function call. In one embodiment, if there are command line parameters in the function call to the main function of the server API of object broker 16b, then the executable associated with application 20 may be performing a control-type function, such as starting up or shutting down a process 24. In one embodiment, if there are no command line parameters in the function call to the main function of the server API of object broker 16b, then the executable may be being brought up as a process 24.

If the main function of the server API of object broker 16b determines at step 204 that there are command line parameters in the function call, then object broker 16b may perform a requested action at step 206 and return to the main function of application 20b at step 208, which may subsequently exit. If the main function of the server API of object broker 16b determines at step 204 that there are no command line parameters in the function call, then at step 210, object broker 16b may perform some initialization, possibly calling the callback function (e.g., daemonInformation) one or more times in the process. In one embodiment, the requests provided to the callback function and the replies expected from the callback function are defined in a header file (e.g., ServerApi.h). These requests and replies may be provided in SDD lists or in any other manner, according to particular needs. Example requests and replies are discussed above with reference to FIG. 1. In one embodiment, a reply from a callback function includes the name of application 20 associated with the callback function and the name of at least one plug-in (e.g. function 22b). At step 212, the process 24 for application 20 implemented using the server API of object broker 16b may be running on server system 14 and the method ends.

FIG. 4 illustrates an example method for registering one or more plug-ins of application 20 with object broker 16b associated with server system 14. At step 300, application 20 may initiate setup of a process 24 implemented using the server API of object broker 16b associated with server system 14. In one embodiment, this step may be performed as described above with reference to FIG. 3, although the present disclosure contemplates performing this step in any suitable manner. Although a daemon is primarily described, the present disclosure contemplates using any suitable process 24, such as a service for example.

In one embodiment, during this startup process in which process 24 is initiated for application 20, object broker 16b may request, at step 302, the name of one or more plug-ins (e.g., functions such as function 22b) associated with application 20. For example, object broker 16b may call the daemonInformation function of application 20, passing as a Request parameter a request for one or more plug-ins associated with application 20 that object broker 16b should start (see, e.g., Request: daemonInformationRequestOBPlugins parameter). In addition to the name of one or more plug-ins to start, object broker 16b may request the name of the DLL or other suitable files to load for the component, the queue name for communicating with this component (if applicable), the SAF queue name for communicating with this component via SAF (if applicable), an indicator indicating whether the component can process multiple commands concurrently, or any other suitable information according to particular needs. Application 20 may return the suitable information at step 304, and object broker may register the plug-ins returned from application 20 at step 306.

FIG. 5 illustrates an example method for registering one or more new plug-ins of application 20 with object broker 16b associated with server system 14. In one embodiment, application 20 or another suitable component may call, at step 400, a component startup function (e.g., a StartupComponent function) of server API of object broker 16b to register and/or launch a new component plug-in (e.g., function 22b of application 20). In one embodiment, more than one component plug-in (e.g., functions of application 20) may be initiated at the same time. For example, an SDD entry may be passed for each component plug-in to be registered and initiated. The SDD list may include the name of the component to be registered with object broker 16b. In one embodiment, the SDD list may include a child SDD list for each component, which may specify the name of the DLL or other suitable files to load for the component, the queue name for communicating with this component (if applicable), the SAF queue name for communicating with this component via SAF (if applicable), an indicator indicating whether the component can process multiple commands concurrently, or any other suitable information according to particular needs. At step 402, object broker 16b may register the component (e.g., function 22b as being associated with process 24 for application 20.

FIG. 6 illustrates an example method for handling client/server communication using object broker 16b of server system 14. The method described with reference to FIG. 6 describes a particular non-limiting example in which application 20 includes a function 22a on client system 12 that sent a message using the client API of object broker 16a on client system 12 (e.g., in the manner described above with reference to FIG. 2). In this non-limiting example, the message sent by function 22a is intended for a function 22b of application 20 on server system 14.

At step 500, object broker 16b may receive a message from object broker 16a on client system 16a. For example, the message received from object broker 16a by object broker 16b may have been sent by function 22a of application 20 on client system 12 and may be intended for function 22b of application 20 on server system 14. In one embodiment, process 24 set up by application 20 using object broker 16b receives the message. In one embodiment, object broker 16b receives the message sent by function 22a on client system 12 (i.e., via object broker 16a) in a separate thread, which may be dedicated to the message queue for function 22b of application 20 on server system 14. At step 502, object broker 16b may initiate loading of the DLL or other suitable file for the component (e.g., function 22b).

At step 504, object broker 16b or another suitable component may call a plug-in command function (e.g., a PluginCommand function) associated with function 22b. In one embodiment, object broker 16b or another suitable component calls the PluginCommand function from the thread on which the message from function 22a was received (i.e., via object broker 16a). In another embodiment, object broker 16b or another suitable component calls the PluginCommand function from a new thread, which may only exist for the duration of the PluginCommand function. This decision may be based on whether or not function 22b is multi-thread, which may be specified when function 22b registered with object broker 16b. The PluginCommand function may be passed a copy of the command string and SDD list specified in the message sent from object broker 16a (i.e., from function 22a). In one embodiment, subsequent to loading of the DLL for the component, the PluginStartup and PluginInitializeComponent functions described above with reference to FIG. 1 may be called before the PluginCommand function is called.

At step 506, the plug-in command function may perform any suitable processing. For example, if the plug-in command function includes a call to a set timer function (e.g., SetTimer) at step 508, then the component may call the SetTimer function of object broker 16b at step 510. At step 512, in response to the component calling the SetTimer function, object broker 16b may set a timer for the component. In one embodiment, after the time interval has elapsed, the component may be called with a command value.

At step 514, the plug-in command function or another suitable component may prompt the component to perform its processing, possibly using the parameters communicated from client system 12. For example, the plug-in command function may prompt function 22b to execute its code given the input parameters communicated from function 22a on client system 12. At step 516, the plug-in command function may determine if the component executed successfully. For example, the plug-in command function may determine if function 22b executed successfully or whether an error should be returned to function 22a on client system 12.

If it is determined at step 516 that the component executed successfully, then the method may proceed to step 518. At step 518, the plug-in command function may call a function for determining whether a reply to a client on client system 12 (e.g., function 22a) is outstanding (e.g., IsReplyOutstanding), such that a client on client system 12 is waiting for a reply from the component. This function may return a Boolean value, which may be TRUE if the client is waiting for a reply and FALSE if the client is not waiting for a response. In one embodiment, if the client (e.g., function 22a) used the Converse function, then the client is waiting for a response and the IsReplyOutstanding function returns TRUE at step 520. In one embodiment, if the client (e.g., function 22a) used the Send function, then the client is not waiting for a reply and the IsReplyOutstanding function returns FALSE at step 520.

If a reply is determined to be needed or desired at step 520, then at step 522 the plug-in command function may call a send reply function (e.g., SendReply) to send a reply to the client (e.g., function 22a on client system 12). In one embodiment, the reply to the client (e.g., function 22a) includes a return code, an optional SDD list containing the results of function 22b, and an optional SDD list that includes any suitable messages. At step 524, if a reply is not needed or desired at step 520, then the plug-in command function may exit.

Returning to step 516, if it is determined that the component did not execute properly or otherwise encountered an error (e.g., function 22b encountered an error), then an error message may be returned. For example, the plug-in command function may return an error message indicating that the component encountered an error. At step 528, object broker 16 may communicate an error message or otherwise notify function 22a that an error occurred.

Although particular methods for communicating messages between components in a client/server environment using an object broker have been described with reference to FIGS. 2-6, the present disclosure contemplates any suitable method for communicating messages between components in a client/server environment using an object broker in accordance with the present disclosure. Thus, certain of the steps described with reference to FIGS. 2-6 may take place simultaneously and/or in different orders than as shown. Moreover, components of system 10 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for communicating messages between components in a client/server environment, comprising:

receiving from a first function run by a first instance of a first application operating on a client system and by an object broker associated with the client system, a first request to communicate with a second function of a second application operating on a server system, the first request comprising one or more first parameters;

receiving from a first function run by a second instance of the first application operating on the client system and by the object broker associated with the client system, a second request to communicate with the second function of the second application operating on the server system, the second request comprising one or more second parameters;

establishing, by the object broker associated with the client system, a connection with the server system associated with the second function based on the first and second requests;

packaging, by the object broker associated with the client system, the one or more first and second parameters for communication to a process on the server system, the second function on the server system having registered with the process; and communicating, by the object broker associated with the client system, the one or more first and second parameters to the process on the server system for initiating the second function.

2. The method of claim 1, wherein the object broker is operable to provide common functionality to each first function associated with the client system, the common functionality of the object broker being provided by one or more client application program interfaces (APIs) operable to be called by each first function.

3. The method of claim 1, wherein the first request to communicate with the second function comprises a first request to receive a reply from the second function on the server system, the one or more first parameters comprising a reply identifier identifying first function of the first instance of the first application as the destination for a reply from the second function; and wherein the second request to communicate with the second function further comprises a second request to receive a reply from the second function on the server system, the one or more second parameters comprising a reply identifier identifying the first function of the second instance of the first application as the destination for a reply from the second function.

4. The method of claim 3, further comprising receiving from the process associated with the second function and by the object broker, an error message indicating that the second function encountered an error if the second function fails to generate a reply within a predetermined time.

5. The method of claim 1, further comprising:
receiving from each first function and by the object broker, a request to initiate a handle for communication with the second function on the server system;
determining, by the object broker, the handle for each first function to use for communication; and
returning, by the object broker, the determined handle to each first function.

6. The method of claim 5, wherein receiving from each first function the request to communicate with the second function comprises:
receiving, by the object broker, the handle for each first function to use for communication; and
receiving, by the object broker, a machine name identifying the server system associated with the second function.

7. The method of claim 1, further comprising receiving, by the object broker, a queue name identifying a queue for queue communication with the second function on the server system, queue communication providing substantially real-time delivery of messages to the second function, the queue associated with the process on the server system.

8. The method of claim 1, further comprising receiving, by the object broker, a store-and-forward (SAF) queue name for SAF communication with the second function on the server system, SAF communication providing substantially guaranteed delivery of the message to the second function on the server system, the SAF queue associated with the process on the server system.

9. The method of claim 1, comprising packaging the one or more first and second parameters using self defined data (SDD).

10. A system for communicating messages between components in a client/server environment, comprising:
a client system coupled to a server system, the client system comprising a first function run by a first instance of a first application operating on the client system, and a first function run by a second instance of the first application operating on the client system, and the server system comprising a second function of the second application operating on the server system;
an object broker associated with the client system and operable to:
receive from the first function run by the first instance of the first application, a first request to communicate with the second function, the first request comprising one or more first parameters;
receive from the first function run by the second instance of the first application, a second request to communicate with the second function, the second request comprising one or more second parameters;
establish a connection with the server system associated with the second function based on the first and second requests;
package the one or more first and second parameters for communication to a process on the server system, the second function on the server system having registered with the process; and
communicate the one or more first and second parameters to the process on the server system for initiating the second function.

11. The system of claim 10, wherein the object broker is operable to provide common functionality to each first function associated with the client system, the common functionality of the object broker being provided by one or more client application program interfaces (APIs) operable to be called by each first function.

12. The system of claim 10, wherein the first request to communicate with the second function comprises a first request to receive a reply from the second function on the server system, the one or more first parameters comprising a reply identifier identifying the first function of the first instance of the first application as the destination for a reply from the second function; and wherein the second request to communicate with the second function further comprises a second request to receive a reply from the second function on the server system, the one or more second parameters comprising a reply identifier identifying the first function of the second instance of the first application as the destination for a reply from the second function.

13. The system of claim 12, wherein the object broker is further operable to receive from the process associated with the second function an error message indicating that the second function encountered an error if the second function fails to generate a reply within a predetermined time.

14. The system of claim 10, wherein the object broker is further operable to:
receive from each first function a request to initiate a handle for communication with the second function on the server system;
determine the handle for each first function to use for communication; and
return the determined handle to each first function.

15. The system of claim 14, wherein the request from each first function to communicate with the second function comprises:
- the handle for the corresponding first function to use for communication; and
- a machine name identifying the server system associated with the second function.

16. The system of claim 10, wherein the object broker is further operable to receive a queue name identifying a queue for queue communication with the second function on the server system, the queue communication providing substantially real-time delivery of messages to the second function, the queue associated with the process on the server system.

17. The system of claim 10, wherein the object broker is further operable to package the one or more first and second parameters using self defined data (SDD).

18. A computer program product comprising a computer-readable storage medium, the computer-readable storage medium comprising computer executable instructions for communicating messages between components in a client/server environment, wherein the computer executable instructions when executed by a processor are operable to:
- receive from a first function run by a first instance of a first application operating on a client system and by an object broker associated with the client system, a first request to communicate with a second function of a second application operating on a server system, the first request comprising one or more first parameters;
- receive from a first function run by a second instance of the first application operating on the client system and by the object broker associated with the client system, a second request to communicate with the second function of the second application operating on the server system, the second request comprising one or more second parameters;
- establish, by the object broker associated with the client system, a connection with the server system associated with the second function based on the first and second requests;
- package, by the object broker associated with the client system, the one or more first and second parameters for communication to a process on the server system, the second function on the server system having registered with the process; and
- communicate, by the object broker associated with the client system, the one or more first and second parameters to the process on the server system for initiating the second function.

19. The computer program product of claim 18, wherein the object broker is operable to provide common functionality to each first function, the common functionality of the object broker being provided by one or more client application program interfaces (APIs) operable to be called by each first function.

20. The computer program product of claim 18, wherein the computer executable instructions are further operable to receive a queue name identifying a queue for queue communication with the second function on the server system, the queue communication providing substantially real-time delivery of messages to the second function, the queue associated with the process on the server system.

21. The computer program product of claim 18, wherein the computer executable instructions are further operable to receive a store-and-forward (SAF) queue name for SAF communication with the second function on the server system, the SAF communication providing substantially guaranteed delivery of the message to the second function on the server system, the SAF queue associated with the process on the server system.

22. The computer program product of claim 18, wherein the process comprises one or more of:
- a daemon; and
- a service.

23. The computer program product of claim 18, wherein the object broker is further operable to:
- receive a request to terminate a connection with the server system;
- destroy a handle associated with each first function used for communicating with the server system; and
- terminate the connection with the server system.

24. The computer program product of claim 18, wherein the object broker is further operable to package the one or more first and second parameters using self defined data (SDD).

* * * * *